US012262181B2

(12) United States Patent
Reinhart et al.

(10) Patent No.: US 12,262,181 B2
(45) Date of Patent: Mar. 25, 2025

(54) APPARATUS AND METHOD FOR REVERBERATION MITIGATION IN A HEARING DEVICE

(71) Applicant: Starkey Laboratories, Inc., Eden Prairie, MN (US)

(72) Inventors: Paul Reinhart, Minneapolis, MN (US); Tim Schoof, Minneapolis, MN (US); Jingjing Xu, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 257 days.

(21) Appl. No.: 18/099,471

(22) Filed: Jan. 20, 2023

(65) Prior Publication Data

US 2023/0239634 A1 Jul. 27, 2023

Related U.S. Application Data

(60) Provisional application No. 63/301,528, filed on Jan. 21, 2022.

(51) Int. Cl.
*H04R 25/00* (2006.01)

(52) U.S. Cl.
CPC ......... *H04R 25/505* (2013.01); *H04R 25/453* (2013.01); *H04R 2225/41* (2013.01); *H04R 2225/43* (2013.01)

(58) Field of Classification Search
CPC H04R 25/505; H04R 25/453; H04R 2225/41; H04R 2225/43
See application file for complete search history.

(56) References Cited

U.S. PATENT DOCUMENTS

| | | | |
|---|---|---|---|
| 8,761,410 | B1 | 6/2014 | Avendano |
| 9,288,576 | B2 | 3/2016 | Togami |

(Continued)

FOREIGN PATENT DOCUMENTS

| | | | |
|---|---|---|---|
| DK | 2381700 | T3 | 3/2015 |
| EP | 3531719 | B1 | 11/2020 |

OTHER PUBLICATIONS

Reinhart, P., Zahorik, P., & Souza, P. (2020). Interactions between digital noise reduction and reverberation: Acoustic and behavioral effects. *Journal of the American Academy of Audiology*, 31(01), 017-029.

(Continued)

*Primary Examiner* — Suhan Ni
(74) *Attorney, Agent, or Firm* — Mueting Raasch Group

(57) ABSTRACT

A reverberation condition is detected affecting an electronic hearing device. The hearing device receives sound from a microphone and provides amplified sound to an in-ear receiver. The reverberation condition is predicted to impact clarity of the amplified sound. A sound processing capability is determined that will affect the reverberation. The sound processing capability is applied to the amplified sound and includes one or more of expansion, compression, and directionality processing. In response to detecting the reverberation condition, at least one of the following is performed: enabling the sound processing capability with a reverberation mitigation setting if the sound processing capability is currently disabled; or changing the sound processing capability to the reverberation mitigation setting from a default setting if the sound processing capability is currently enabled. The reverberation mitigation setting is removed when the reverberation condition is no longer detected.

20 Claims, 7 Drawing Sheets

(56) References Cited

U.S. PATENT DOCUMENTS

| | | | | |
|---|---|---|---|---|
| 9,491,545 | B2 | 11/2016 | Iyengar | |
| 10,490,204 | B2 | 11/2019 | Markovich Golan | |
| 10,762,914 | B2 | 9/2020 | Caroselli | |
| 10,869,140 | B2 | 12/2020 | Falch | |
| 2010/0196861 | A1* | 8/2010 | Lunner | H04R 25/505 434/112 |
| 2013/0304459 | A1* | 11/2013 | Pontoppidan | H03G 3/00 381/104 |

OTHER PUBLICATIONS

Meyers, "Reducing Reverberation with EchoShield: Clinical Outcomes," Jul. 1, 2016 *Signia*, 4 pages.
Savia, "EchoBlock: Proven to be highly effective in reverberant situations" *Field Study News*, Phonak, 2 pages.
Xia, "Effects of reverberation and noise on speech intelligibility in normal-hearing and aided hearing-impaired listeners" Mar. 2018, *J. Accoust. Soc. Am* 143 (3), pp. 1523-1533.

* cited by examiner

APPARATUS AND METHOD FOR REVERBERATION MITIGATION IN A HEARING DEVICE

RELATED PATENT DOCUMENTS

This application claims the benefit of U.S. Provisional Application No. 63/301,528, filed on Jan. 21, 2022, which is incorporated herein by reference in its entirety.

SUMMARY

This application relates generally to ear-level electronic systems and devices, including hearing aids, personal amplification devices, and hearables. In one embodiment, a reverberation condition is detected affecting an electronic hearing device. The hearing device receives sound from a microphone and provides amplified sound to an in-ear receiver. The reverberation condition is predicted to impact clarity of the amplified sound. A sound processing capability is determined that will affect the reverberation. The sound processing capability is applied to the amplified sound and includes one or more of expansion processing, compression processing, and directionality processing. In response to detecting the reverberation condition, at least one of the following is performed: enabling the sound processing capability with a reverberation mitigation setting if the sound processing capability is currently disabled; or changing the sound processing capability to the reverberation mitigation setting from a default setting if the sound processing capability is currently enabled. The reverberation mitigation setting is removed when the reverberation condition is no longer detected.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below makes reference to the following figures.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Embodiments disclosed herein are directed to an ear-worn or ear-level electronic hearing device. Such a device may include cochlear implants and bone conduction devices, without departing from the scope of this disclosure. The devices depicted in the figures are intended to demonstrate the subject matter, but not in a limited, exhaustive, or exclusive sense. Ear-worn electronic devices (also referred to herein as "hearing aids," "hearing devices," and "ear-wearable devices"), such as hearables (e.g., wearable earphones, ear monitors, and earbuds), hearing aids, hearing instruments, and hearing assistance devices, typically include an enclosure, such as a housing or shell, within which internal components are disposed.

Embodiments described herein relate to apparatuses and methods for reverberation mitigation of auditory signals and optimizing auditory perception using ear-worn devices. Reverberation in an acoustic environment has a significant detrimental effect on speech perception, especially for older listeners with hearing impairment. Generally, reverberation occurs when the surrounding acoustic features, e.g., reflective, parallel walls, reflect sound with an amplitude and phase offset that reduces the intelligibility of speech and other sounds. For example, large cuboidal spaces with block or stone walls such as school gymnasiums and cathedrals often exhibit significant reverberation.

The proposed embodiments provide a "reverberation mitigation feature" to be used in reverberant environments to minimize the effects of reverberation on speech perception. The reverberation mitigation feature comprises signal processing manipulations of existing features, including expansion, compression, directionality, and digital noise reduction. Specifically, when activated the reverberation mitigation feature may, among other things, enable/increase expansion processing, increase compression release times, enable fixed directional processing, and reduce digital noise reduction strength.

Figure 1:
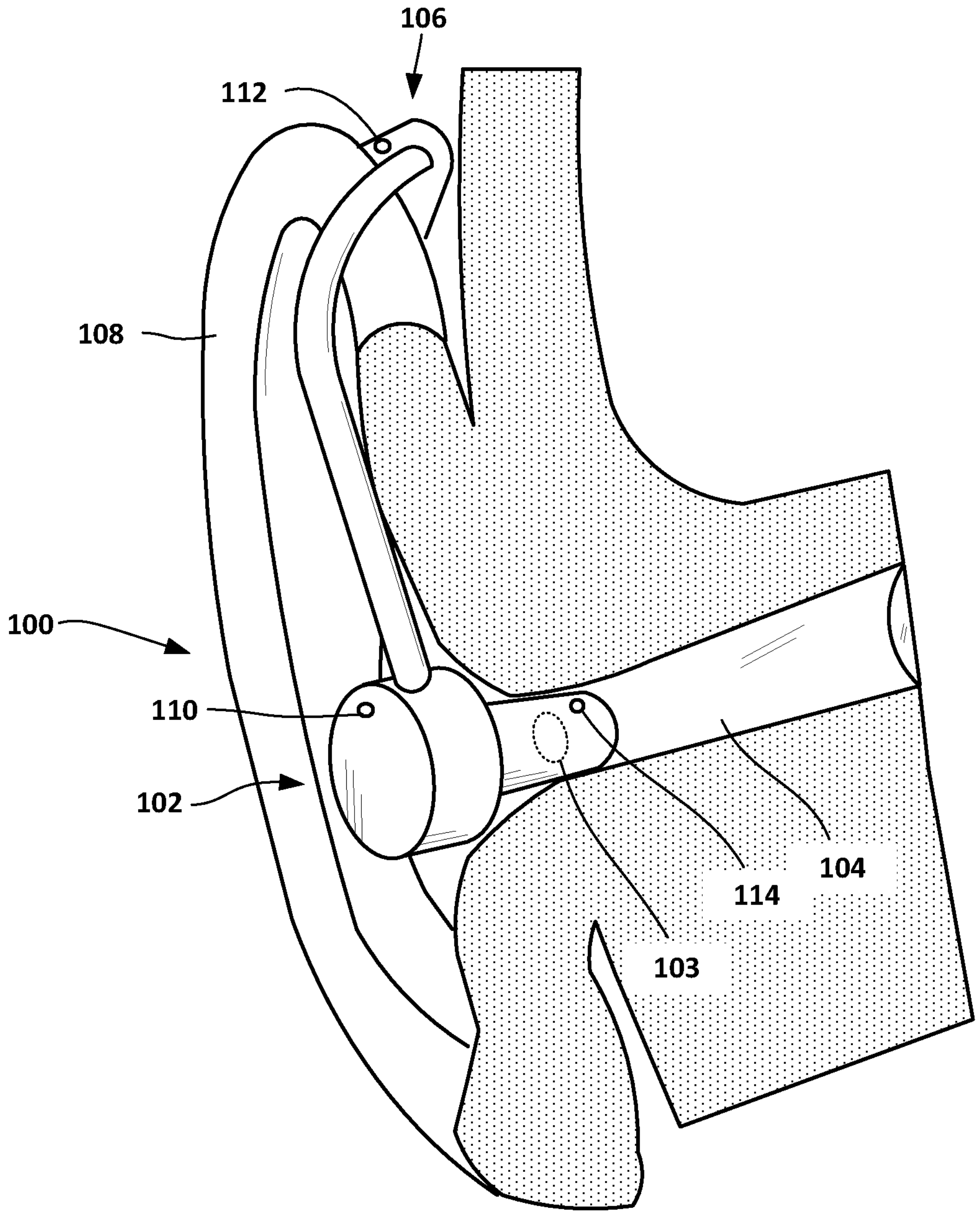
FIG. 1 is an illustration of a hearing device according to an example embodiment.

In FIG. 1, a diagram illustrates an example of an ear-wearable device 100 that may include reverberation features according to an example embodiment. The ear-wearable device 100 includes an in-ear portion 102 that fits into the ear canal 104 of a user/wearer. The ear-wearable device 100 may also include an external portion 106, e.g., worn over the back of the outer ear 108. The external portion 106 is electrically and/or acoustically coupled to the internal portion 102. The in-ear portion 102 may include an acoustic transducer 103, although in some embodiments the acoustic transducer may be in the external portion 106, where it is acoustically coupled to the ear canal 104, e.g., via a tube. The acoustic transducer 103 may be referred to herein as a "receiver," "loudspeaker," etc., however could include a bone conduction transducer. One or both portions 102, 106 may include an external microphone, as indicated by respective microphones 110, 112.

The device 100 may also include an internal microphone 114 that detects sound inside the ear canal 104. The internal microphone 114 may also be referred to as an inward-facing microphone or error microphone. Other components of hearing device 100 not shown in the figure may include a processor (e.g., a digital signal processor or DSP), memory circuitry, power management and charging circuitry, one or more communication devices (e.g., one or more radios, a near-field magnetic induction (NFMI) device), one or more antennas, buttons and/or switches, for example. The hearing device 100 can incorporate a long-range communication device, such as a Bluetooth® transceiver or other type of radio frequency (RF) transceiver.

While FIG. 1 show one example of a hearing device, often referred to as a hearing aid (HA), the term hearing device of the present disclosure may refer to a wide variety of ear-level electronic devices that can aid a person with impaired hearing. This includes devices that can produce processed sound for persons with normal hearing. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing device" or "ear-wearable device," which is understood to refer to a system comprising a single left ear device, a single right ear device, or a combination of a left ear device and a right ear device.

A hearing device 100 as described below includes intended to be used to improve signal processing of reverberant acoustic signals to minimize the detrimental effects and improve listener perception. Reverberation refers to the persistence of sound due to reflections of the acoustic energy off surfaces in an environment. Reverberation is ubiquitous to varying degrees in typical listening environments, as characterized by how much time it takes for the reflected energy to decay (reverberation time). Listening environments with longer reverberation times, where the low-level energy reflections persist for longer, can pose a significant issue for speech perception by masking subsequent speech energy. Older listeners with hearing impairment in particular are highly susceptible to the adverse effects of reverberation on speech perception due to cognitive and auditory processing changes.

This disclosure relates to a "reverberation mitigation feature" to be used in reverberant environments to minimize the effects of reverberation on speech perception. The feature may be activated/deactivated via user input and/or automatically. The feature can utilize existing capabilities of certain hearing devices, such as expansion, compression, directionality, and digital noise reduction. While these capabilities may be used to generally improve audibility of speech, they are not specifically targeted to the mitigation of reverberation effects. By specially configuring these features, alone or in combination, a hearing device providing this feature can improve audibility of speech (or other target sound patterns) under reverberant ambient conditions.

Figure 2:
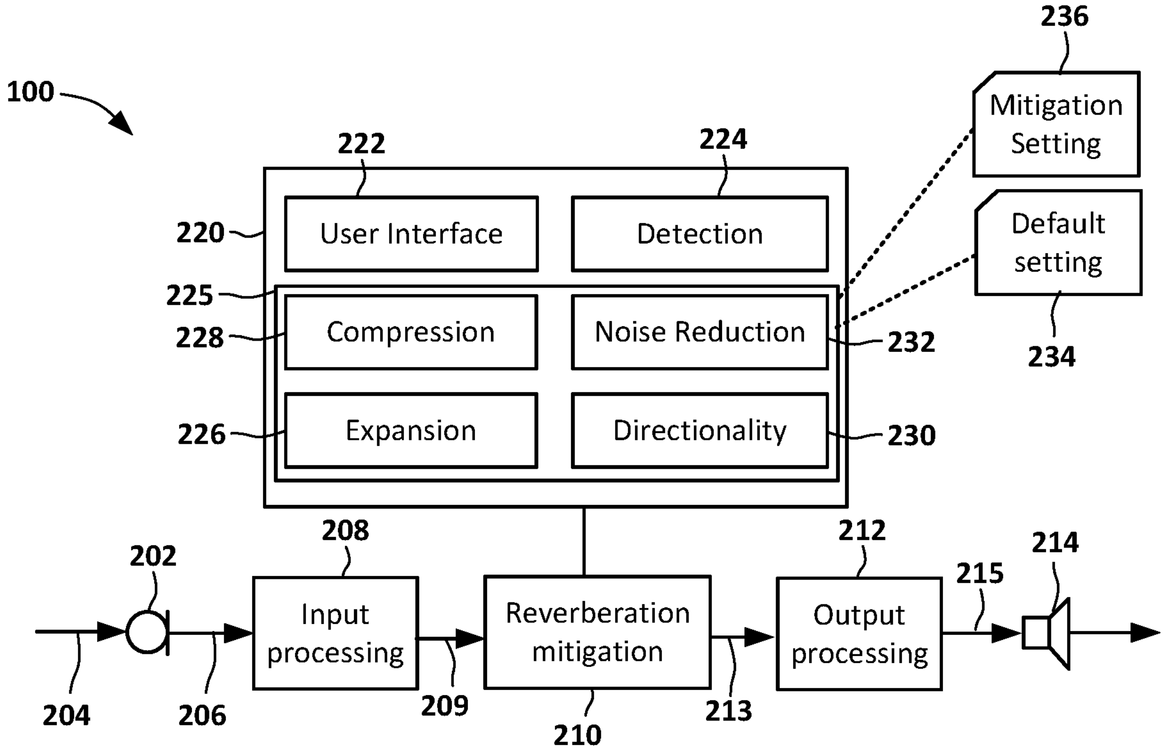
FIG. 2 is a block diagram of a processing in a hearing device according to an example embodiment.

In FIG. 2, a diagram illustrates features of a device 100 according to an example embodiment. The device 100 includes a microphone 202 that receives external sound 204 and produces an input audio signal 206 in response. The audio signal 206 is received by an input processing path 208, which may include circuits such as filters, preamplifiers, analog-to-digital converters (ADCs) as well as digital signal processing algorithms (e.g., digital filters, conversion between time and frequency domains, up/down sampling, etc.). A digital signal 209 is output from the input processing path 208, and may represent an audio signal in a time domain or a frequency domain.

A reverberation mitigation block 210 receives the signal 209 and processes to reduce the effects of reverberation and provide an enhanced signal 213, which is input to an output processing path 212. The output processing path 212 may include circuits such as filters, amplifiers, digital-to-analog converters (DAC) as well as digital signal processing algorithms similar to the input processing block 208. The output processing path 212 produces an analog output audio signal 215 that is input to a transducer, such as a receiver 214 (also commonly referred to as a loudspeaker) that produces sound 217 in the ear canal.

Some features of the reverberation mitigation block 210 are shown in detail function block 220. A user interface 222 may activate and deactivate the reverberation via user input, such as acoustically (e.g., user issue a voice command that will be registered by the system's microphone(s)) or manually, such as by touchscreen input on an accessory device, manual button presses on the hearing device, finger taps registered by an IMU sensor, etc. The feature may also be activated by a hearing professional, such as in a specific hearing aid memory via programming software. Configuration of the reverberation mitigation may also be performed via the user interface 222, e.g., setting level of mitigation, defining contexts in which mitigation should be automatically switched on or off, etc.

In configurations where the mitigation features can be activated/deactivated automatically, a detection function 224 may be used to detect when the mitigation should be automatically switched on or off, e.g., when entering/exiting reverberant environments. The reverberance of an environment could be determined using several methods. One detection method is known as Automatic Environmental Classification (AEC), which uses input to the microphone 202 and processor to classify the acoustic environment the system is in. If the AEC classifies the environment as auditorium/large room speech or another environment likely containing reverberation and sounds of interest (e.g., speech), then the reverberation mitigation feature may be automatically activated.

Another method that may be used by the detection function 224 is Global Positioning System (GPS). The system could use GPS to detect when a user is in a space that is typically reverberant, such as a church, auditorium, or natatorium. When the user is in such an environment, then the reverberation mitigation feature may be automatically activated. The GPS receiver could be located on the hearing device 100, or on a remote device (e.g., smart phone) and the location communicated to the device over a wireless data link or the like (e.g., Bluetooth™).

Another method that may be used by the detection function 224 "Smart Environment", which is described, for example, in U.S. Patent Publication 20180192208, Jul. 5, 2018, to Zhang et al. In a smart environment, the hearing aid may receive a hearing program parameter over the Internet for configuring the device with optimal signal processing for that environment. In a smart environment containing reverberation, the system may get passed information to automatically activate the reverberation mitigation feature, and optionally specific mitigation configurations that are tailored to the particular environment.

Figure 3:
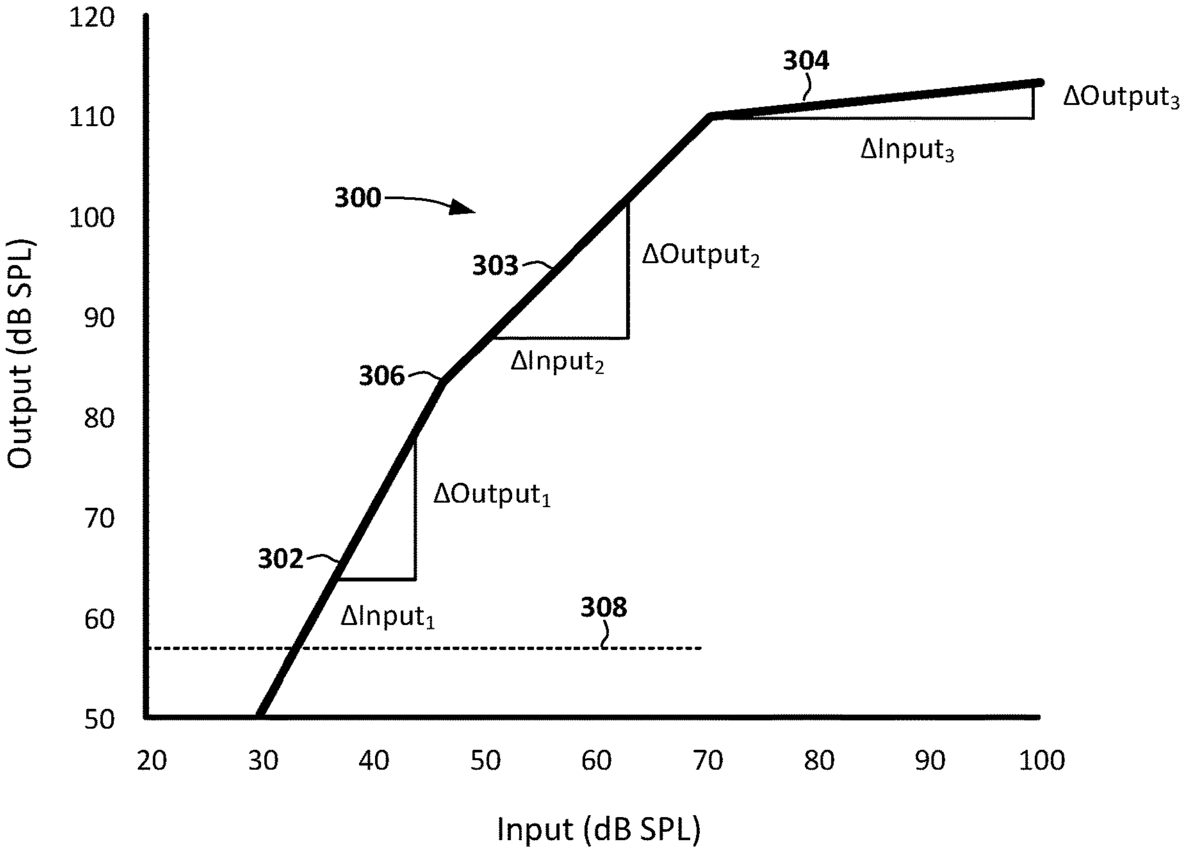
FIGS. 3 and 4 are graphs showing expansion and compression settings according to example embodiments.

The reverberation mitigation function block 220 includes signal processing manipulations of existing features, including expansion 226, compression 228, directionality 230, and digital noise reduction 232. The expansion processing 226 is used for inputs below a certain threshold kneepoint (e.g., 45 dB SPL), such that low-level intensity inputs receive less gain than high-intensity inputs. An example of expansion processing is shown in the graph of FIG. 3. A curve 300 shows a relationship between input and output sound pressure level (SPL) over a range of inputs. Regions 302-304 represent different compression/expansion ratios, with region 302 being expanded ($\Delta Input_1/\Delta Output_1$ less than 1) and region 303 having no expansion or compression ($\Delta Input_2/\Delta Output_2$ is ~1). The transition between regions 302, 303 is the threshold kneepoint 306. Region 304 indicates compression, because the $\Delta Input_3/\Delta Output_3$ greater than 1. This illustrates how compression can be performed together with expansion in audio processing.

Expansion may reduce the amplification of the undesirable reflected energy, which is lower in amplitude due to decay. When activated, the reverberation mitigation feature 220 can enable expansion processing if it is not currently enabled. In potential embodiments, the reverberation mitigation feature can also make change the expansion parameters if the expansion is currently enabled but using default parameters that are not tuned for reverberation mitigation. For example, changing the expansion parameters may make the expansion more aggressive, such as by using shorter time constants (e.g. attack time and release time<50 ms), greater expansion ratio (e.g., 0.5:1 to 0.2:1), and/or higher threshold kneepoint (e.g., >45 dB SPL). As shown in FIG. 3, this can result in moving the threshold kneepoint 306 to the right, and increasing the slope of region 302. For example, if the sound level of reflected energy is primarily below the indicated line 308 in FIG. 3, then sounds softer than this level will exhibit less amplification than sounds above that level, which cause the reverberated sound (usually softer than the direct sound) to be less audible.

In a potential embodiment, the effective bandwidth of expansion may be limited. Reverberation in real-world listening environments is typically greatest in the low to mid frequencies, approximately 200-1200 Hz. Therefore, limiting expansion to this bandwidth may be most effective at reducing reverberation without having additional negative consequences on speech audibility. Or if specific reverberation parameters of the user's environment are known (e.g., directly measured or drawn from another source, expansion bandwidth could be limited to those frequencies.

Figure 4:
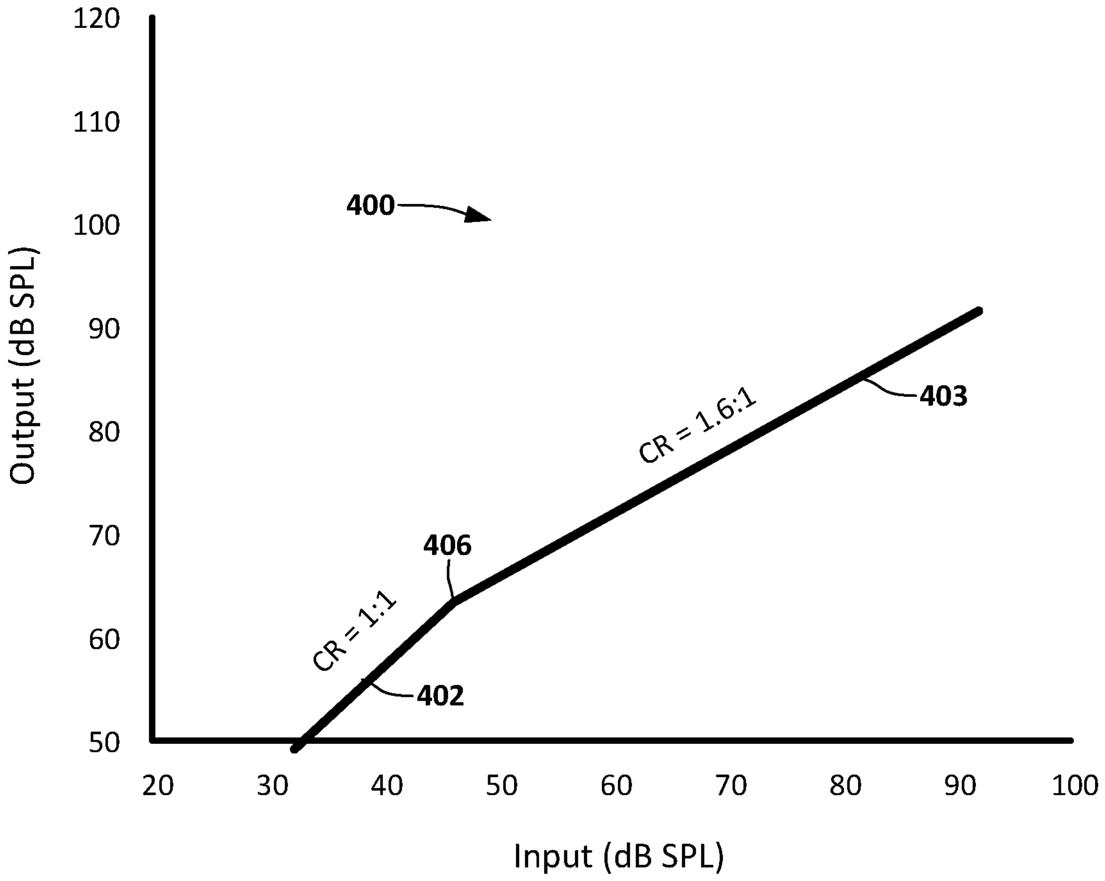

In another embodiment, compression processing 228 may be used. An example of compression processing is shown in the graph of FIG. 4. A curve 400 shows a relationship between input and output sound pressure level (SPL) over a range of inputs. Regions 402, 403 represent compression ratios, with region 403 being compressed by a 1.6:1 ratio and a region 402 not being compressed (1:1 compression ratio). The transition between regions 402, 403 is the compression threshold kneepoint 406. Compression amplification is used for inputs above a certain threshold kneepoint 406 (e.g., 45 dB SPL), such that high-intensity inputs receive less gain than low-intensity inputs.

The rate at which gain is varied in response to input level changes during compression is partially controlled by the release time constant. Systems with shorter release times are quicker to increase gain in response to a decrease in input level than longer release times. Previous research has shown improved speech understanding when using longer compression release times in reverberant environments. One potential explanation for this is that the fast gain increase with short release times may lead to the overamplification of the low-intensity reflections that are detrimental to speech understanding. When activated, the reverberation mitigation feature will increase the compression release time (e.g., >500 ms).

Hearing aids may use directionality processing 230 to focus the amplification of sounds originating from a specific spatial location. It does so by utilizing two or more microphones separated by a specific distance and using the difference in the arrival time of sound between the microphones to estimate a sound sources spatial location. When in fixed directional mode, the hearing aid focuses on amplifying the sound in front of a lister, which is typically where most listeners would like to attend to. When in adaptive directional mode, the hearing aid analyzes the signal input and changes its focus (e.g., in front, to either side, behind) based on where it estimates speech is coming from.

Because reverberation causes sound energy to reflect off surfaces and reach the hearing aid from all directions, reverberation has been shown to confuse adaptive processing, which relies on spatial arrival of sound energy. To prevent an adaptive system from being confused about where the speech is coming from due to reverberant reflections and selecting the wrong place (e.g., speech is from front but reverberant reflections from left cause system to focus on the left), when activated the reverberation mitigation feature will set the directionality processing 230 to fixed directional.

The reverberation mitigation may disable digital noise reduction 232 processing or reduce the amount of noise reduction. Noise reduction algorithms reduce the amplification of noise by estimating the signal-to-noise ratio in different bands and reducing gain if noise is the dominant signal. Although these algorithms have become increasingly advanced, the reliance on estimations of the speech and noise source acoustics invariably leads to occasional misclassification of the signals (e.g., speech misclassified as noise and vice versa). This misclassification introduces acoustic artifact which distorts the speech information. Preliminary research has shown that reverberation can disrupt digital noise reduction algorithms causing them to introduce additional acoustic artifact and speech distortion (Reinhart et al., 2020). When activated, the reverberation mitigation feature will reduce the strength of noise reduction (e.g., reduce maximum gain reduction).

Generally, the expansion processing 228, compression processing 228, directionality processing 230, and digital noise reduction 232 are all existing capabilities of the hearing device 100 shown in FIG. 2. These processing capabilities can be configured in any combination to collectively act as a sound processor 225 for reverberation mitigation. Because the individual processing capabilities may already be included in an existing product, there may be default settings 234 applied to these processors, e.g., via software configuration. These default settings 234 may include whether a particular processing is enabled, as well as operational parameters (e.g., threshold kneepoints, expansion and compression ratios, bandwidth limitations) that are optimized for non-reverberant environments. For example, these default settings 234 may be input by an audiologist to compensate for a patient-specific hearing impairment.

When reverberation conditions are predicted and/or detected, a reverberation mitigation setting 236 may be applied to the sound processor 225 which may affect multiple processing functions. While these mitigation settings 236 may be non-optimal for general use, they may provide improved audibility of speech in a reverberant environment. It will also be understood that multiple sets of mitigation settings 236 may be provided and used based on details particular to the local aural environment, such as energy of reverberation, reverberation delay, other ambient sounds detected (speech, music, noise), etc.

Figure 5:
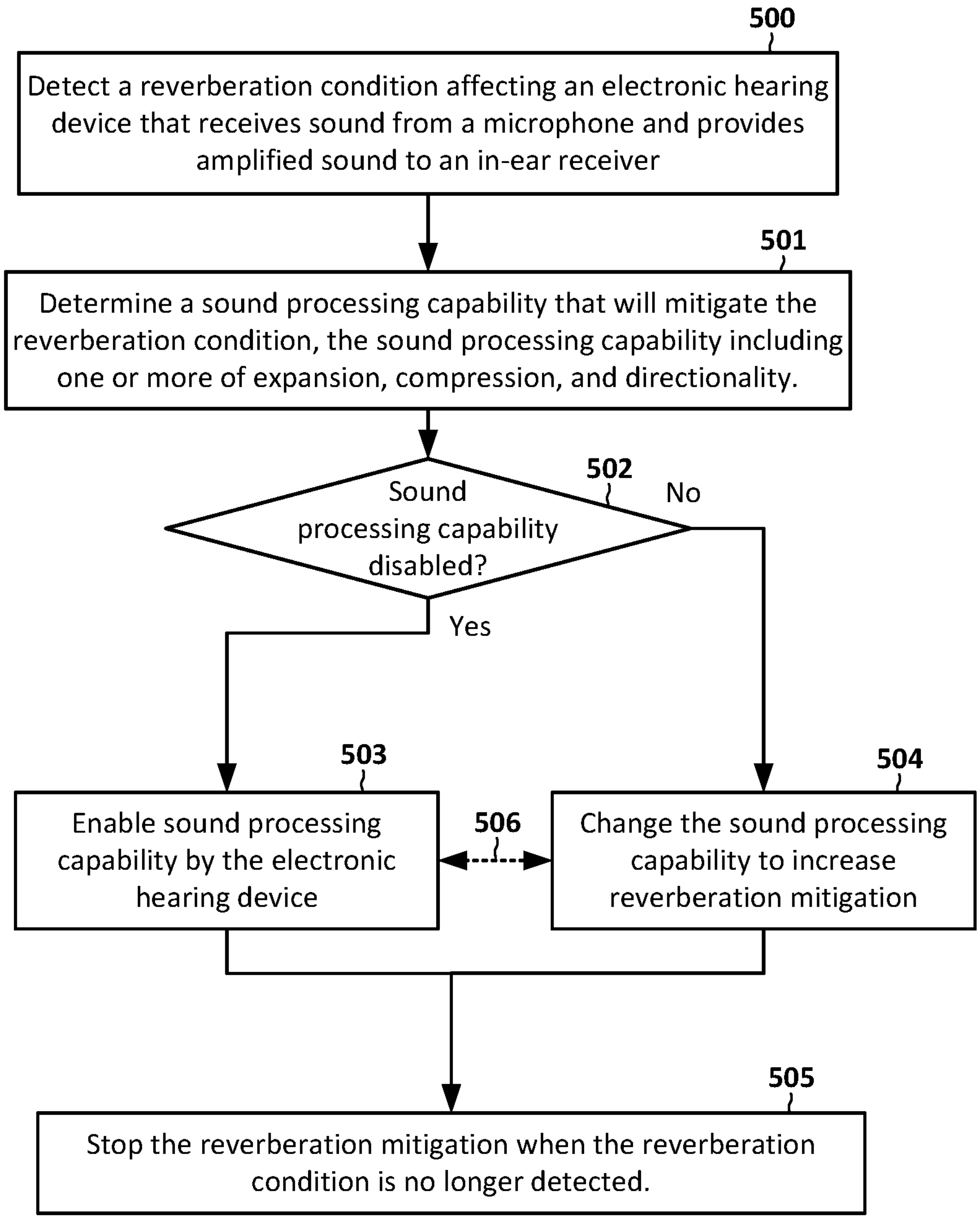
FIGS. 5 and 6 are flowcharts of methods according to example embodiments.

In FIG. 5, a flowchart shows a method according to an example embodiment. The method involves detecting 500 a reverberation condition affecting an electronic hearing device that receives sound from a microphone and provides amplified sound to an in-ear receiver. The reverberation condition is predicted to impact clarity of the amplified sound (e.g., satisfies a measured threshold, predicted based on current location, etc.). A sound processing capability is determined 501 that will affect the reverberation. The sound processing capability includes one or more of expansion processing, compression processing, and directionality processing, and these sound processing capabilities can be used in any combination.

In response to detecting 500 the reverberation condition, the method may involve enabling 503 the sound processing capability with a reverberation mitigation setting if the sound processing capability is currently disabled (block 502 returns 'yes'). The method may involve changing 504 the sound processing capability to the reverberation mitigation setting from a default setting if the sound processing capability is currently enabled (block 502 returns 'no'). As indicated by line 506, both enabling 503 and changing 504 may occur in some cases, and may occur in any order. The reverberation mitigation is stopped 505 when the reverberation condition is no longer detected. This may involve removing the reverberation mitigation setting, changing the sound processing capability to the default setting, or disabling the sound processing capability altogether.

Figure 6:
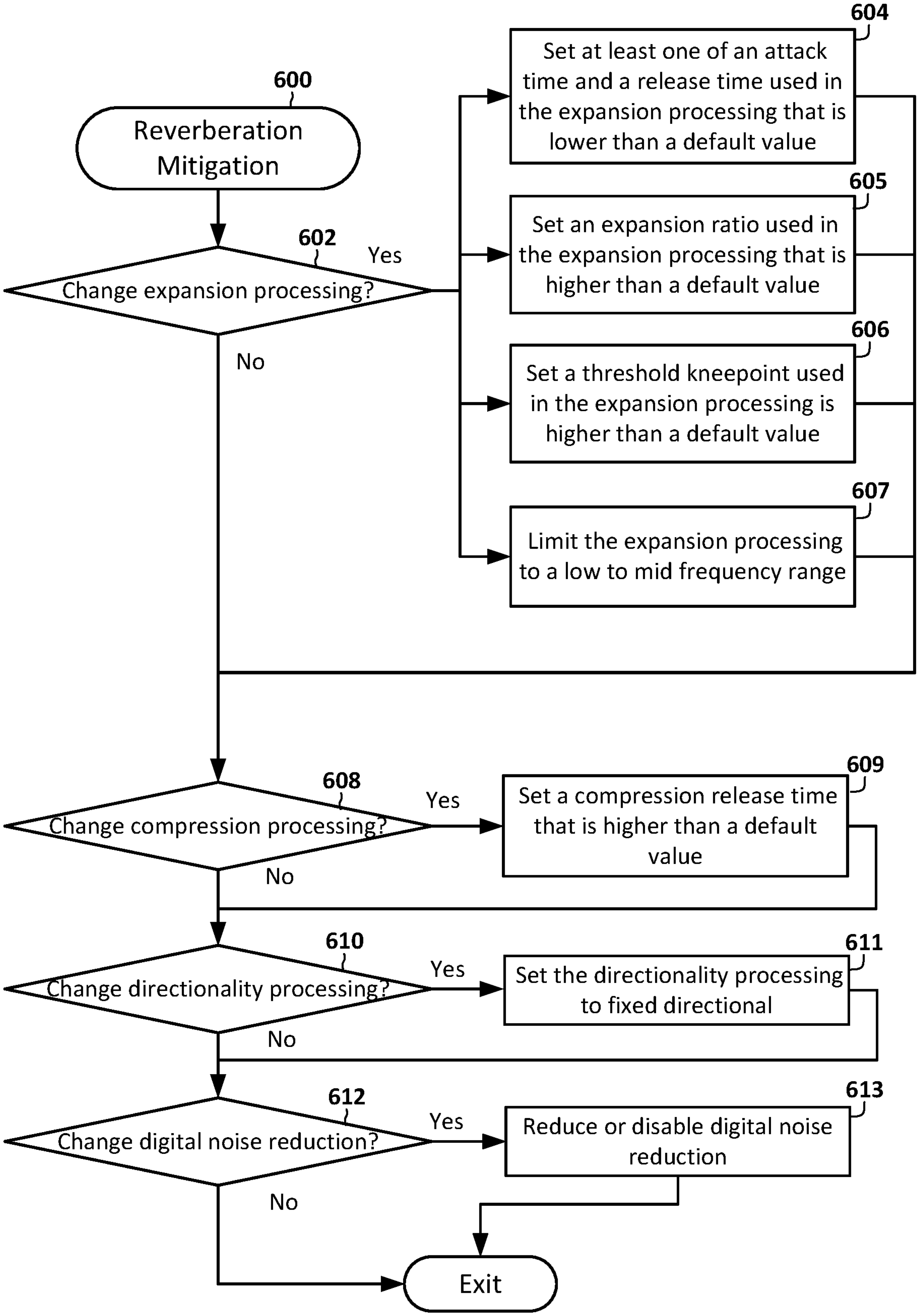

In FIG. 6, a flowchart shows how the reverberation mitigation 600 may be enabled by applying settings to a sound processing capability according to an example embodiment. If the sound processing capability includes expansion processing, block 602 returns 'yes' and any combination of settings 604-607 may be applied. Setting 604 includes at least one of an attack time and a release time used in the expansion processing that are lower than default values. Setting 605 includes an expansion ratio used in the expansion processing that is higher than a default value. Setting 606 includes a threshold kneepoint used in the expansion processing that is higher than a default value. Setting 607 limits the expansion processing to a low to mid frequency range (e.g., 200-1200 Hz).

If the sound processing capability includes compression processing, block 608 returns 'yes' and setting 609 may be applied, which is a compression release time that is higher than a default value. If the sound processing capability includes directionality processing, block 610 returns 'yes' and setting 611 may be applied, which sets the directional processing to fixed directional. If the sound processing capability includes digital noise reduction, block 612 returns 'yes' and setting 613 may be applied, which disables the digital noise reduction or reduces an amount of the digital noise reduction applied to the amplified sound.

Figure 7:
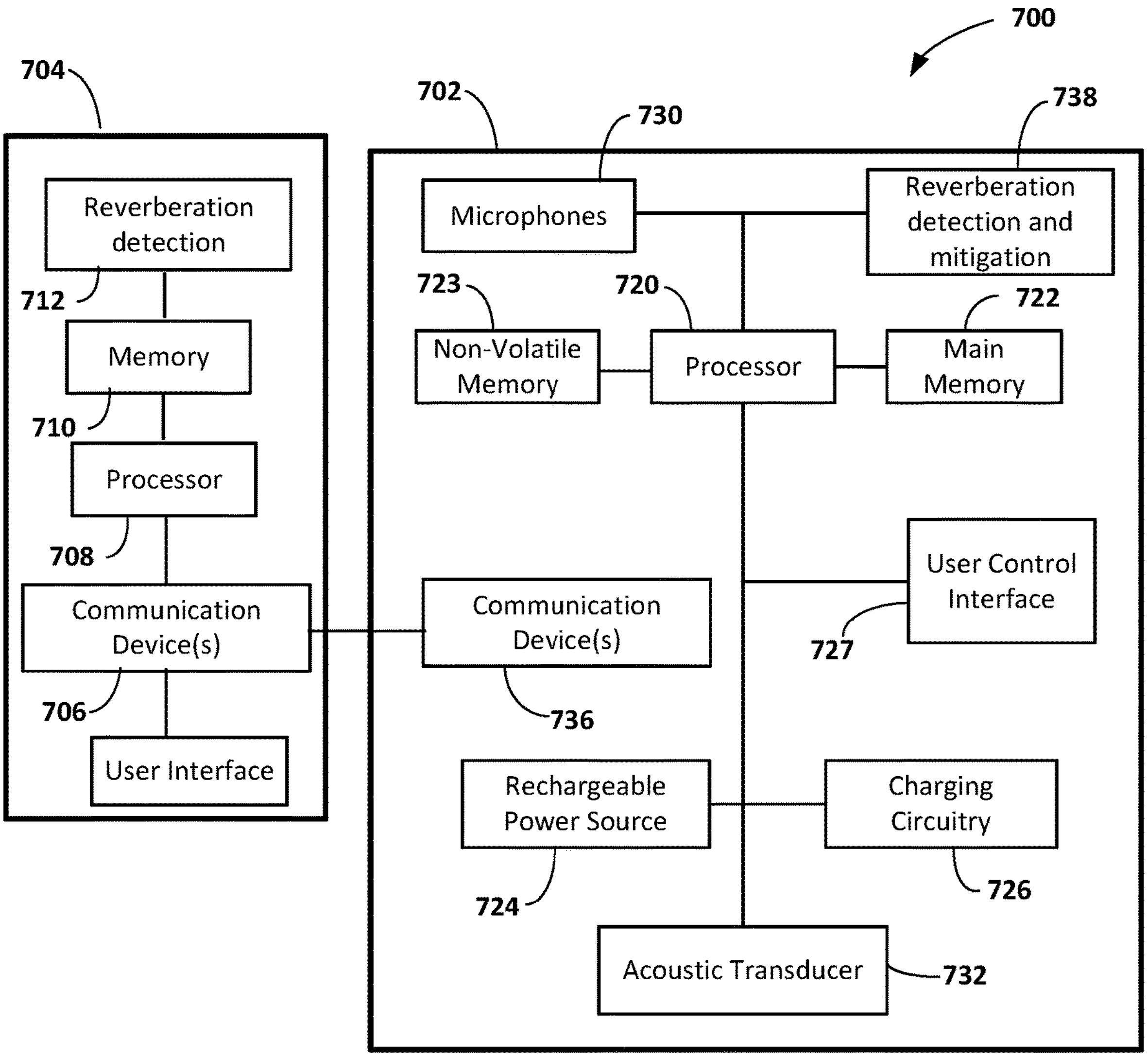
FIG. 7 is a block diagram of a hearing device and system according to an example embodiment.

In FIG. 7, a block diagram illustrates a system and ear-worn hearing device 700 in accordance with any of the embodiments disclosed herein. The hearing device 700 includes a housing 702 configured to be worn in, on, or about an ear of a wearer. The hearing device 700 shown in FIG. 7 can represent a single hearing device configured for monaural or single-ear operation or one of a pair of hearing devices configured for binaural or dual-ear operation. The hearing device 700 shown in FIG. 7 includes a housing 702 within or on which various components are situated or supported. The housing 702 can be configured for deployment on a wearer's ear (e.g., a behind-the-ear device housing), within an ear canal of the wearer's ear (e.g., an in-the-ear, in-the-canal, invisible-in-canal, or completely-in-the-canal device housing) or both on and in a wearer's ear (e.g., a receiver-in-canal or receiver-in-the-ear device housing).

The hearing device 700 includes a processor 720 operatively coupled to a main memory 722 and a non-volatile memory 723. The processor 720 can be implemented as one or more of a multi-core processor, a digital signal processor (DSP), a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 720 can include or be operatively coupled to main memory 722, such as RAM (e.g., DRAM, SRAM). The processor 720 can include or be operatively coupled to non-volatile (persistent) memory 723, such as ROM, EPROM, EEPROM or flash memory. As will be described in detail hereinbelow, the non-volatile memory 723 is configured to store instructions that facilitate using estimators for eardrum sound pressure based on SP measurements.

The hearing device 700 includes an audio processing facility operably coupled to, or incorporating, the processor 720. The audio processing facility includes audio signal processing circuitry (e.g., analog front-end, analog-to-digital converter, digital-to-analog converter, DSP, and various analog and digital filters), a microphone arrangement 730, and an acoustic transducer 732 (e.g., loudspeaker, receiver, bone conduction transducer). The microphone arrangement 730 can include one or more discrete microphones or a microphone array(s) (e.g., configured for microphone array beamforming). Each of the microphones of the microphone arrangement 730 can be situated at different locations of the housing 702. It is understood that the term microphone used herein can refer to a single microphone or multiple microphones unless specified otherwise. The acoustic transducer 732 produces amplified sound inside of the ear canal.

The hearing device 700 may also include a user interface with a user control interface 727 operatively coupled to the processor 720. The user control interface 727 is configured to receive an input from the wearer of the hearing device 700. The input from the wearer can be any type of user input, such as a touch input, a gesture input, or a voice input. The user control interface 727 may be configured to receive an input from the wearer of the hearing device 700.

The hearing device 700 also includes a reverberation detection and mitigation module 738 operably coupled to the processor 720. The reverberation detection and mitigation module 738 can be implemented in software, hardware (e.g., digitals signal processor), or a combination of hardware and software. During operation of the hearing device 700, the reverberation detection and mitigation module 738 can be used to detect reverberation and in response, change settings of (and enable/disable) various processing modules as described above.

The hearing device 700 can include one or more communication devices 736. For example, the one or more communication devices 736 can include one or more radios coupled to one or more antenna arrangements that conform to an IEEE 802.7 (e.g., Wi-Fi®) or Bluetooth® (e.g., BLE, Bluetooth® 4.2, 5.0, 5.1, 5.2 or later) specification, for example. In addition, or alternatively, the hearing device 700 can include a near-field magnetic induction (NFMI) sensor (e.g., an NFMI transceiver coupled to a magnetic antenna) for effecting short-range communications (e.g., ear-to-ear communications, ear-to-kiosk communications). The communications device 736 may also include wired communications, e.g., universal serial bus (USB) and the like.

The communication device 736 is operable to allow the hearing device 700 to communicate with an external computing device 704, e.g., a smartphone, laptop computer, etc. The external computing device 704 includes a communications device 706 that is compatible with the communications device 736 for point-to-point or network communications. The external computing device 704 includes its own processor 708 and memory 710, the latter which may encompass both volatile and non-volatile memory. The external computing device 704 includes a reverberation detector 712 that may provide signals to the reverberation mitigation module 738 of the hearing device 700. For example, the reverberation detector 712 may determine a reverberation condition based on any combination of Internet data/parameters, geolocation data (e.g., GPS, WiFi localization), and direct measurements via a microphone (not shown) of the external computing device 704.

The hearing device 700 also includes a power source, which can be a conventional battery, a rechargeable battery (e.g., a lithium-ion battery), or a power source comprising a supercapacitor. In the embodiment shown in FIG. 5, the hearing device 700 includes a rechargeable power source 724 which is operably coupled to power management circuitry for supplying power to various components of the hearing device 700. The rechargeable power source 724 is coupled to charging circuitry 726. The charging circuitry 726 is electrically coupled to charging contacts on the housing 702 which are configured to electrically couple to corresponding charging contacts of a charging unit when the hearing device 700 is placed in the charging unit.

This document discloses numerous example embodiments, including but not limited to the following:

Example 1 is method comprising: detecting a reverberation condition affecting an electronic hearing device that receives sound from a microphone and provides amplified sound to an in-ear receiver, the reverberation condition predicted to impact clarity of the amplified sound; determining a sound processing capability that will affect the reverberation, the sound processing capability applied to the amplified sound and comprising one or more of expansion processing, compression processing, and directionality processing; in response to detecting the reverberation condition, performing at least one of enabling the sound processing capability with a reverberation mitigation setting if the sound processing capability is currently disabled or changing the sound processing capability to the reverberation mitigation setting from a default setting if the sound processing capability is currently enabled; and removing the reverberation mitigation setting when the reverberation condition is no longer detected.

Example 2 includes the method of example 1, wherein the sound processing capability comprises the expansion processing, and wherein the reverberation mitigation setting comprises at least one of an attack time and a release time used in the expansion processing that are lower than default values. Example 3 includes the method of example 1 or 2, wherein the sound processing capability comprises the expansion processing, and wherein the reverberation mitigation setting comprises an expansion ratio used in the expansion processing that is higher than a default value.

Example 4 includes the method of any one of examples 1-3, wherein the sound processing capability comprises the expansion processing, and wherein the reverberation mitigation setting comprises a threshold kneepoint used in the expansion processing is higher than a default value. Example 5 includes the method of any one of examples 1-4, wherein the sound processing capability comprises the expansion processing, and the reverberation mitigation setting limits the expansion processing to a low to mid frequency range. Example 6 includes the method of example 5, wherein the low to mid frequency range comprises 200-1200 Hz.

Example 7 includes the method of any one of examples 1-6, wherein the sound processing capability comprises the compression processing, and wherein the reverberation mitigation setting comprises a compression release time that is higher than a default value. Example 8 includes the method of any one of examples 1-7, wherein the sound processing capability comprises the directionality processing, and wherein the reverberation mitigation setting sets the directionality processing to fixed directional. Example 9 includes the method of any one of examples 1-8, wherein the electronic hearing device is further configured for digital noise reduction of the amplified sound, and wherein the reverberation mitigation further comprises disabling the digital noise reduction or reducing an amount of the digital noise reduction applied to the amplified sound.

Example 10 includes the method of any one of examples 1-9, wherein detecting the reverberation condition comprises using automatic environmental classification. Example 11 includes the method of any one of examples 1-9, wherein detecting the reverberation condition comprises detecting a location of the electronic hearing device and determining that the location is a reverberant environment. Example 12 includes the method of any one of examples 1-9, wherein detecting the reverberation condition comprises receiving an Internet-supplied hearing parameter that indicates the reverberation condition. Example 13 includes the method of any one of example 1-9, wherein detecting the reverberation condition comprises receiving a user input that indicates the reverberation condition. Example 14 is a hearing device comprising a sound processor operable to perform the method of any one of examples 1-13.

Example 15 is hearing device comprising: an input processing path that receives an audio input signal from a microphone; an output processing path that provides an audio output signal to a loudspeaker; and a sound processor coupled between the input processing path and the output processing path, the sound processor comprising one or more of expansion processing, compression processing, directionality processing, and digital noise reduction. The hearing device is configured to perform: detecting a reverberation condition affecting the hearing device and predicted to impact clarity of the audio output signal; in response to detecting the reverberation condition, applying a reverberation mitigation setting to the sound processor, the reverberation mitigation setting different a default setting that optimizes the audio output signal for a user of the hearing device; and removing the reverberation mitigation setting when the reverberation condition is no longer detected.

Example 16 includes the hearing device of example 15, wherein the sound processor comprises the expansion processing, and wherein the reverberation mitigation setting comprises at least one of an attack time and a release time used in the expansion processing that are lower than default values. Example 17 includes the hearing device of example 15 or 16, wherein the sound processor comprises the expansion processing, and wherein the reverberation mitigation setting comprises an expansion ratio used in the expansion processing that is higher than a default value. Example 18 includes the hearing device of any one of examples 15-17, wherein the sound processor comprises the expansion processing, and wherein the reverberation mitigation setting comprises a threshold kneepoint used in the expansion processing is higher than a default value.

Example 19 includes the hearing device of any one of examples 15-18, wherein the sound processor comprises the expansion processing, and the reverberation mitigation setting limits the expansion processing to a low to mid frequency range. Example 20 includes the hearing device of example 19, wherein the low to mid frequency range comprises 200-1200 Hz.

Example 21 includes the hearing device of any one of examples 15-20, wherein the sound processor comprises the compression processing, and wherein the reverberation mitigation setting comprises a compression release time that is higher than a default value. Example 22 includes the hearing device of any one of examples 15-21, wherein the sound processor comprises directionality processing, and wherein the reverberation mitigation setting sets the directionality processing to fixed directional. Example 23 includes the hearing device of any one of examples 15-22, wherein the reverberation mitigation further comprises disabling the digital noise reduction or reducing an amount of the digital noise reduction applied to the audio output signal.

Example 24 includes the hearing device of any one of examples 15-23, wherein detecting the reverberation condition comprises using automatic environmental classification. Example 25 includes the hearing device of any one of examples 15-23, wherein detecting the reverberation condition comprises detecting a location of the hearing device and determining that the location is a reverberant environment. Example 26 includes the hearing device of any one of examples 15-23, wherein detecting the reverberation condition comprises receiving an Internet-supplied hearing parameter that indicates the reverberation condition. Example 27 includes the hearing device of any one of example 15-23, wherein detecting the reverberation condition comprises receiving a user input that indicates the reverberation condition.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

The invention claimed is:

1. A method comprising:

detecting a reverberation condition affecting an electronic hearing device that receives sound from a microphone and provides amplified sound to an in-ear receiver, the reverberation condition predicted to impact clarity of the amplified sound;

determining a sound processing capability that will affect the reverberation, the sound processing capability applied to the amplified sound and comprising one or more of expansion processing, compression processing, and directionality processing;

in response to detecting the reverberation condition, performing at least one of enabling the sound processing capability with a reverberation mitigation setting if the sound processing capability is currently disabled or changing the sound processing capability to the reverberation mitigation setting from a default setting if the sound processing capability is currently enabled; and removing the reverberation mitigation setting when the reverberation condition is no longer detected.

2. The method of claim 1, wherein the sound processing capability comprises the expansion processing, and wherein the reverberation mitigation setting comprises at least one of an attack time and a release time used in the expansion processing that are lower than default values.

3. The method of claim 1, wherein the sound processing capability comprises the expansion processing, and wherein the reverberation mitigation setting comprises an expansion ratio used in the expansion processing that is higher than a default value.

4. The method of claim 1, wherein the sound processing capability comprises the expansion processing, and wherein the reverberation mitigation setting comprises a threshold kneepoint used in the expansion processing is higher than a default value.

5. The method of claim 1, wherein the sound processing capability comprises the expansion processing, and the reverberation mitigation setting limits the expansion processing to a low to mid frequency range.

6. The method of claim 5, wherein the low to mid frequency range comprises 200-1200 Hz.

7. The method of claim 1, wherein the sound processing capability comprises the compression processing, and wherein the reverberation mitigation setting comprises a compression release time that is higher than a default value.

8. The method of claim 1, wherein the sound processing capability comprises the directionality processing, and wherein the reverberation mitigation setting sets the directionality processing to fixed directional.

9. The method of claim 1, wherein the electronic hearing device is further configured for digital noise reduction of the amplified sound, and wherein the reverberation mitigation further comprises disabling the digital noise reduction or reducing an amount of the digital noise reduction applied to the amplified sound.

10. The method of claim 1, wherein detecting the reverberation condition comprises using automatic environmental classification.

11. The method of claim 1, wherein detecting the reverberation condition comprises detecting a location of the electronic hearing device and determining that the location is a reverberant environment.

12. The method of claim 1, wherein detecting the reverberation condition comprises receiving an Internet-supplied hearing parameter that indicates the reverberation condition.

13. The method of claim 1, wherein detecting the reverberation condition comprises receiving a user input that indicates the reverberation condition.

14. A hearing device comprising:

an input processing path that receives an audio input signal from a microphone;

an output processing path that provides an audio output signal to a loudspeaker; and a sound processor coupled between the input processing path and the output processing path, the sound processor comprising one or more of expansion processing, compression processing, directionality processing, and digital noise reduction, wherein the hearing device is configured to perform:

detecting a reverberation condition affecting the hearing device and predicted to impact clarity of the audio output signal;

in response to detecting the reverberation condition, applying a reverberation mitigation setting to the sound processor, the reverberation mitigation setting different a default setting that optimizes the audio output signal for a user of the hearing device; and removing the reverberation mitigation setting when the reverberation condition is no longer detected.

15. The hearing device of claim 14, wherein the sound processor comprises the expansion processing, and wherein the reverberation mitigation setting comprises at least one of an attack time and a release time used in the expansion processing that are lower than default values.

16. The hearing device of claim 14, wherein the sound processor comprises the expansion processing, and wherein the reverberation mitigation setting comprises an expansion ratio used in the expansion processing that is higher than a default value.

17. The hearing device of claim 14, wherein the sound processor comprises the expansion processing, and wherein the reverberation mitigation setting comprises a threshold kneepoint used in the expansion processing is higher than a default value.

18. The hearing device of claim 14, wherein the sound processor comprises the expansion processing, and the reverberation mitigation setting limits the expansion processing to a low to mid frequency range.

19. The hearing device of claim 14, wherein the sound processor comprises the compression processing, and wherein the reverberation mitigation setting comprises a compression release time that is higher than a default value.

20. The hearing device of claim 14, wherein the sound processor comprises directionality processing, and wherein the reverberation mitigation setting sets the directionality processing to fixed directional.

* * * * *